United States Patent
Dadig et al.

(10) Patent No.: US 12,539,553 B2
(45) Date of Patent: Feb. 3, 2026

(54) ROTATING ELECTRICAL CONNECTION WITH LOCKING AXIAL AND RADIAL POSITIONS FOR USE IN WELDING AND CUTTING DEVICES WITH A NON-CONDUCTIVE COUPLING

(71) Applicant: American Torch Tip Company, Bradenton, FL (US)

(72) Inventors: Steven Dadig, Palmetto, FL (US); Travis Hall, Bradenton, FL (US); Juan Reynaldo Solis, Jr., Bradenton, FL (US)

(73) Assignee: American Torch Tip Company, Bradenton, FL (US)

( * ) Notice: Subject to any disclaimer, the term of this patent is extended or adjusted under 35 U.S.C. 154(b) by 359 days.

(21) Appl. No.: 16/892,694

(22) Filed: Jun. 4, 2020

(65) Prior Publication Data
US 2021/0060690 A1     Mar. 4, 2021

Related U.S. Application Data

(63) Continuation-in-part of application No. 16/556,822, filed on Aug. 30, 2019.

(51) Int. Cl.
| | |
|---|---|
| *B23K 9/32* | (2006.01) |
| *B23K 9/10* | (2006.01) |
| *H01R 4/70* | (2006.01) |
| *H01R 13/639* | (2006.01) |

(52) U.S. Cl.
CPC .............. *B23K 9/321* (2013.01); *B23K 9/10* (2013.01); *H01R 4/70* (2013.01); *H01R 13/639* (2013.01)

(58) Field of Classification Search
CPC .......... B23K 9/10; B23K 9/321; B23K 9/323; H01R 13/639; H01R 4/70
See application file for complete search history.

(56) References Cited

U.S. PATENT DOCUMENTS

| | | | | |
|---|---|---|---|---|
| 2,529,552 A | * | 11/1950 | Herold | F16L 19/12 285/356 |
| 3,279,701 A | | 10/1966 | Falk | |
| 3,413,018 A | | 11/1968 | Franis | |
| 3,659,250 A | * | 4/1972 | Horton | H01R 13/6276 439/348 |
| 4,049,943 A | * | 9/1977 | Pratt | B23K 9/323 219/136 |
| 4,050,149 A | * | 9/1977 | Storck | H01R 13/15 439/852 |

(Continued)

FOREIGN PATENT DOCUMENTS

| | | |
|---|---|---|
| CN | 108907412 A | 11/2018 |
| JP | 2004167583 A | 6/2004 |

(Continued)

*Primary Examiner* — Michael G Hoang
*Assistant Examiner* — Logan P Jones
(74) *Attorney, Agent, or Firm* — Emerson, Thomson & Bennett, LLC; Roger D. Emerson; Todd A. Fichtenberg

(57) ABSTRACT

Rotating electrical connection with locking axial and radial positions for use in welding and cutting devices including a non-conductive coupling that isolates the current path between a locking section and a conductive section of the receiving member body. The receiving member body including a release member designed to exert a compressive force on an interference member.

17 Claims, 20 Drawing Sheets

(56) References Cited

U.S. PATENT DOCUMENTS

| | | | | |
|---|---|---|---|---|
| 4,376,564 A * | 3/1983 | Kilbourne | ............ | H01R 33/971 |
| | | | | 439/339 |
| 4,549,068 A * | 10/1985 | Kensrue | ................ | B23K 9/323 |
| | | | | 219/137.31 |
| 5,129,837 A * | 7/1992 | Williams | ........... | H01R 13/6276 |
| | | | | 439/348 |
| 5,260,546 A | 11/1993 | Ingwersen et al. | | |
| 5,338,917 A * | 8/1994 | Stuart | .................... | B23K 9/323 |
| | | | | 219/137.61 |
| 5,384,447 A | 1/1995 | Raloff et al. | | |
| 5,571,427 A * | 11/1996 | Dimock | ................ | B23K 9/296 |
| | | | | 219/136 |
| 5,595,671 A | 1/1997 | David | | |
| 5,984,709 A * | 11/1999 | Zink | ................. | H01R 13/6276 |
| | | | | 439/348 |
| 6,206,432 B1 * | 3/2001 | Kamiyama | ............. | F16L 37/23 |
| | | | | 285/348 |
| 2004/0068911 A1 * | 4/2004 | Schurtenberger | ....... | F41A 23/02 |
| | | | | 42/94 |
| 2010/0012637 A1 | 1/2010 | Jaeger | | |
| 2010/0029145 A1 * | 2/2010 | Balsells | ................ | H01R 39/20 |
| | | | | 439/827 |
| 2012/0125903 A1 * | 5/2012 | Izutani | ................... | B23K 9/173 |
| | | | | 219/136 |
| 2014/0131336 A1 | 5/2014 | Jacques | | |
| 2020/0069316 A1 | 3/2020 | DeSoutter | | |

FOREIGN PATENT DOCUMENTS

| | | | | |
|---|---|---|---|---|
| WO | 2010028645 A1 | 3/2010 | | |
| WO | WO-2010135752 A2 * | 12/2010 | ............. | B23K 9/323 |

* cited by examiner

ROTATING ELECTRICAL CONNECTION WITH LOCKING AXIAL AND RADIAL POSITIONS FOR USE IN WELDING AND CUTTING DEVICES WITH A NON-CONDUCTIVE COUPLING

RELATED APPLICATIONS

This application claims the benefit of the filing dated of U.S. patent application Ser. No. 16/556,822 filed on Aug. 30, 2019, entitled "Rotating Electrical Connection with Locking Axial and Radial Positions for Use in Welding and Cutting Devices, by Dadig et. al., the entirety of which is incorporated herein by reference.

FIELD OF INVENTION

The present invention is in the technical field of electrical connections for use in electrical welding and cutting devices. More particularly, the present invention is in the technical field of welding torches for use in gas metal arc welding (GMAW) or as commonly known "MIG" welding applications. Additionally, the present invention can be used in other electrical welding and cutting applications including but not limited to plasma cutting torches and tungsten inert gas welding (TIG) welding torches.

BACKGROUND OF THE INVENTION

MIG welding torches have been used in the metal fabrication industry for many years and various manufactures have produced many variations of welding torch bodies. A basic MIG welding torch is presented in FIG. 1 of U.S. Pat. No. 3,529,128 by Cruz (hereinafter '128 patent). As presented in FIG. 1 of the '128 patent, a MIG welding torch 10 has a tubular body 12, a switch actuator 17, a curved insulated neck 18, and a welding head 16. The welding torch presented in the '128 patent is a relatively early design that does not have ergonomic features, removability or rotatability of the insulated neck 18. The ability to remove and or rotate the insulated neck 18 present in the '128 patent, which has come to be commonly known as a "gooseneck," has since been attempted by various manufactures. The majority of removable and rotatable goosenecks use a variation of a locking collar, typically in the form of an annular cavity, that accepts a circular or tubular end of the gooseneck. A typical variation of this locking collar design can be seen in FIG. 1. A slot 1 is cut into the receiver body 2, thereby creating the two halves of the compressive collar 3 where one side is threaded 4 and the other has design feature 5 to accept a screw. When a screw (not shown) is used to pull the two halves of the compressive collar 3 together, an installed gooseneck (not shown) will be locked in place. This type of design exclusively relies on the compressive force created by pulling the two halves of the compressive collar 3 together. In order to produce enough compressive force in the compressive collar 3, a tool is needed to tighten the screw used in designs of this type.

Another variation of the compressive collar design was used in the "Quick Load®" gooseneck manufactured by Tregaskiss. In this variation of the compressive collar design, a lever was used to exert the compressive force on the gooseneck in same way that lever locks are use in bicycle seat collars. In this design, and all other locking collar designs, electrical conduction is achieved by contact between the cylindrical portion of the gooseneck and the annular portion of the compressive collar. The quality of the electrical connection is dependent on the compressive force between the cylindrical portion of the gooseneck and the compressive collar of the "Quick Load®" torch. Regardless of the method used to create the compressive force, a screw or lever, compressive forces are generated between the compressive collar and mating end of the gooseneck. Additionally, the internal bore of the compressive collar and mating end of the gooseneck are smooth and thus require considerable amounts of torque to be exerted on the screw or lever used to create the compression needed for electrical conduction. Often, designs that use screws are overtightened which leads to damaged or stripped threads in the compressive collar, thus preventing the locking of the gooseneck or proper electrical conduction. Overtightening is not necessary to wear out the threads in the compressive collar, which are typically made of brass or copper, because the screws used to tighten the collar are of a much harder material. Typically, the screws used are Allen Head screws that are grade 8.8 or 12.9. The act of locking the gooseneck requires the screws to stretch the threads of the locking collar, which will wear or damage the threads of the compressive collar over the course of repeated usage due to the difference in material properties between the locking screw and compressive collar.

The material used for the mating end of the gooseneck is typically a copper rod or tubing. The copper used in the gooseneck is softer, has a lower modulus of elasticity and yield stress, and can deform and yield to the brass compressive collar when the screw or lever is tightened. The compressive collar has a fixed amount of travel that is defined by the slit or gap between the two halves of the compressive collar. If the mating end of the gooseneck yields or deforms past the travel allowed by the gap between the two halves of the compressive collar, the gooseneck will not be locked, nor will there be a sufficient compression for an electrical connection. The amount of current used in hand held MIG welding can be 400 amps or higher. Arching between the gooseneck and welding torch body can occur when there is a poor electrical connection, and at the currents used in welding torches, severe damage can occur.

End users of MIG welding torches have been known to use the welding torches to knock off slag from fresh welds, which can exert rotational and or transverse forces on the gooseneck. Repeated use of the MIG welding torch in this manner can increase the speed at which the compressive collar and mating end of the gooseneck wear. The combination of failure modes such as the deformation of the mating end of the gooseneck, thread wear, and deformation of the locking collar can be exacerbated by using the welding torch body as a hammer by the end user. This practice uses the gooseneck as the working end of the "hammer" and will introduce additional stresses to gooseneck.

BRIEF DESCRIPTION

A welding torch body in accordance with an embodiment of the present invention includes a distal and a proximal end. A receiving member is installed in the proximal end of the welding torch body and is co-linear with the central axis of the welding torch body. The receiving member has a plurality of locking members, an electrical connection, a release member, and a non-conductive coupling between a locking section and a conductive section of the receiving member. The receiving member of the welding torch body is configured to receive a lockable gooseneck, when installed in the receiving member the lockable gooseneck is prevented from movement in the axial and radial directions about the central axis of the receiving member by the plurality of locking members, and provided an electrical connection between the lockable gooseneck and welding torch body.

An embodiment of a receiving member for use in a welding torch body includes a locking section and a conductive section. The locking section and the conductive section are configured to be attached, via mechanical attachment or other known methods of attachment. The locking section and conduction section can be insulated from one another. A non-conductive coupling can be used to insulate the locking section and conduction section. An insulating member can be used to insulate the locking section and conduction section.

BRIEF DESCRIPTION OF THE DRAWINGS

Figures are not drawn to scale. The figures depict one or more embodiments of the present invention. The features, aspects and advantages of the present disclosure will become better understood when the following detailed description is read with reference to the accompanying drawings in which like characters represent like parts throughout the drawings, wherein.

Figure 1:
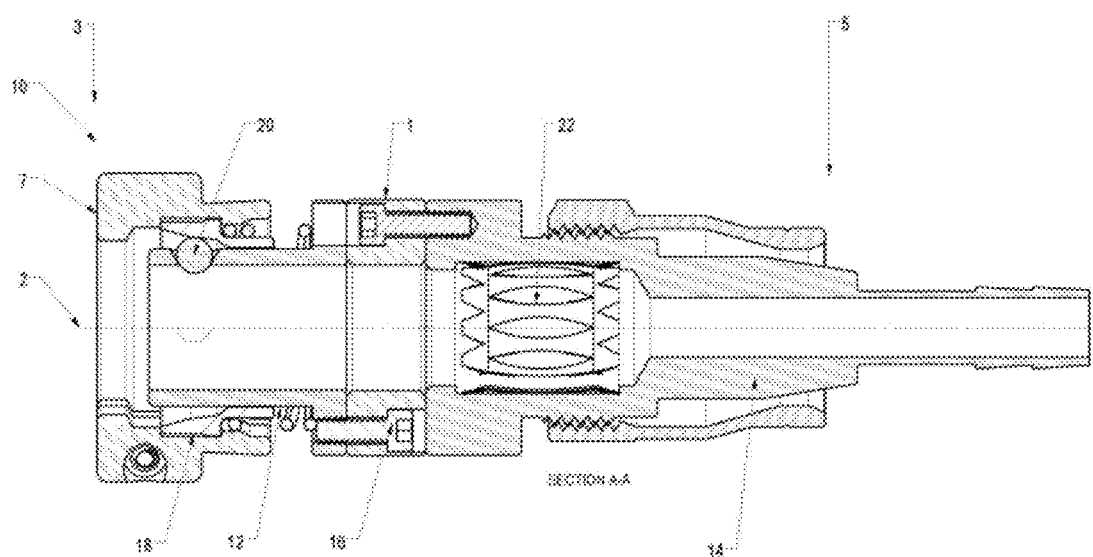
FIG. 1 is cross-section view of a receiving member in accordance with an embodiment of the present invention.

To the extent features are illustrated schematically, details, connections and components of an apparent nature may not be shown, or may not be drawn to scale, to emphasize other features of the invention. Suggested dimensions of features are only exemplary.

The figures illustrate one or more embodiments of a rotating electrical connection and component features thereof. Vertical and horizontal directions and orientations of the electrical connection and component features thereof are described with reference to the exemplary, fully configured welding torch assembly, shown in a cross-section view in FIG. 1.

DETAILED DESCRIPTION OF THE INVENTION

Referring now to the drawings, the present invention provides an apparatus and related learning methods for a rotating electrical with locking axial and radial positions for use in welding and cutting devices with a non-conductive coupling, wherein like reference numerals designate identical or corresponding parts throughout the several views, embodiments of the invention are shown.

A cross-section view of a receiving member 10, in accordance with an embodiment of the present invention, can be seen in FIG. 1. The receiving member 10 has a proximal end 3 and a distal end 5. A release member 7 is located on the proximal end 3 of the receiving member 10. In this embodiment the release member 7 can be manufactured from a non-conductive material, such as nylon. The non-conductive coupling 1 can be manufactured out of any non-conductive material, including but not limited to ceramics and or plastics. As can be seen in FIG. 1, bolts 16 mechanically attach the non-conductive coupling 1 to the locking section 12 and conductive section 14 of the receiving member 10. The bolts 16 pass through the non-conductive coupling 1 in the axial direction, along central axis 2, into the respective section of the receiving member 10. The bolt 16 that is threaded into the locking section 12 passes through the non-conductive coupling 1 towards the proximal end 3 of the receiving member 10 along the axial direction. The bolts 16 that are threaded into the conductive section 14 pass through the non-conductive coupling 1 towards the distal end 5 of the receiving member 10 along the axial direction. With no electrical flow path in the locking section 12 of the receiving member 10, electrical current cannot travel to through the metal balls 20 and into the interference member 18. This prevents the possibility of micro arching between the locking member 12, balls 20, and interference member 18; which can damage or prematurely wear out the effected components of the receiving member 10.

Figure 5:
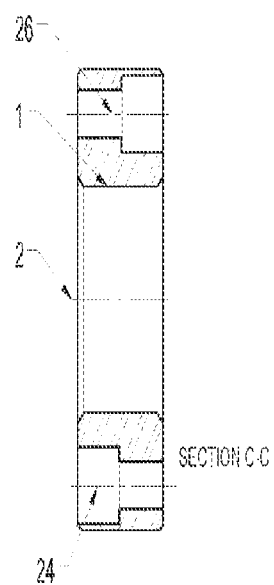
FIG. 5 is another cross-section view of a non-conductive coupling in accordance with an embodiment of the present invention.

An embodiment of a non-conductive coupling 1 can be seen in FIGS. 2-5. The non-conductive coupling 1 can be cylindrical or disc shaped as seen in FIGS. 2-5 but the non-conductive coupling can be manufactured in any shape that meets the dimensional requirements of the particular embodiment of receiving member 10 that it is designed. The non-conductive coupling 1 has at least two sets of bolt holes that pass through the non-conductive coupling 1 in the axial direction. This embodiment has locking section bolt holes 26 and conductive section bolt holes 24. The bolt holes can be counter bored, as seen in FIGS. 1 and 5, such that head of the bolts 16 is recessed within the non-conductive coupling 1, as seen in FIG. 1. The non-conductive coupling 1 can have a series of locating features 28, in this embodiment a set of threaded sections, that lock the receiving member 10, within a welding torch handle (not shown), in the axial and radial directions. The non-conductive coupling 1 is designed to allow a gooseneck to pass through an opening 30. The opening 30 can be centered within the non-conductive coupling 1. In this embodiment the opening 30 is concentric within the non-conductive coupling 1 about the central axis 2.

Figure 1A:
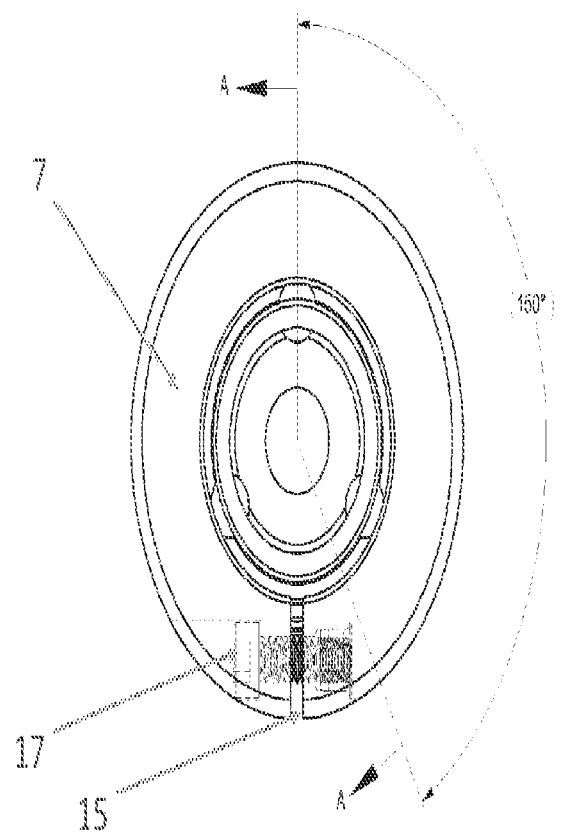
FIG. 1a is an elevation view of the front of receiving member in accordance with an embodiment of the present invention.
Figure 1B:
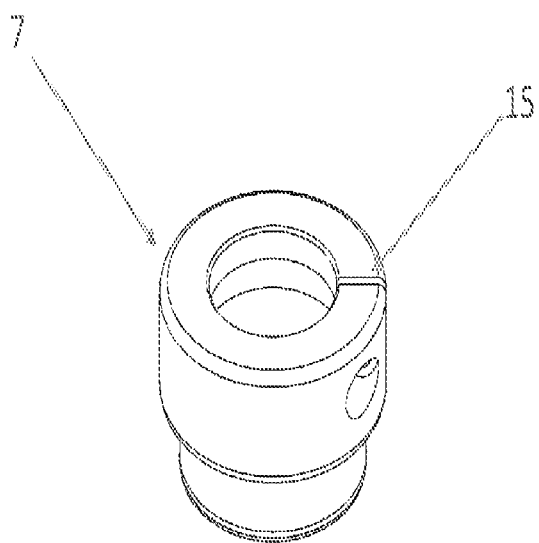
FIG. 1b is perspective view of a release member in accordance with an embodiment of the present invention.
Figure 1C:
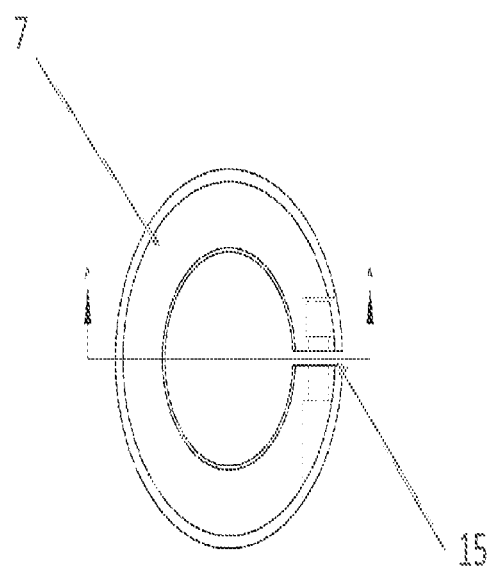
FIG. 1c is a top view of a release member in accordance with an embodiment of the present invention.
Figure 1D:
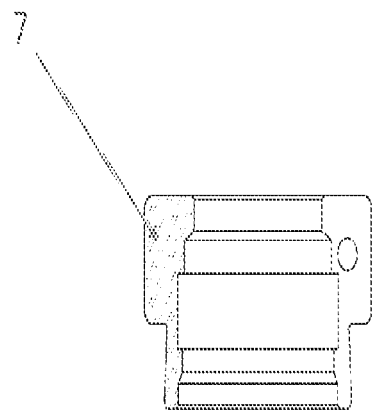
FIG. 1d is a cross-section view of release member of FIG. 1c through cut plane A-A.
Figure 2:
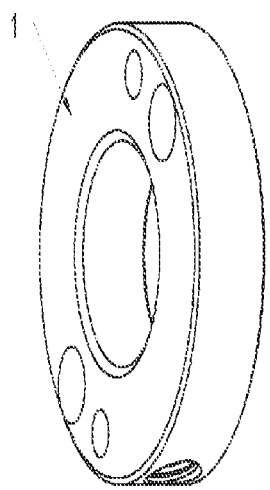
FIG. 2 is a perspective view of a non-conductive coupling in accordance with an embodiment of the present invention.
Figure 3:
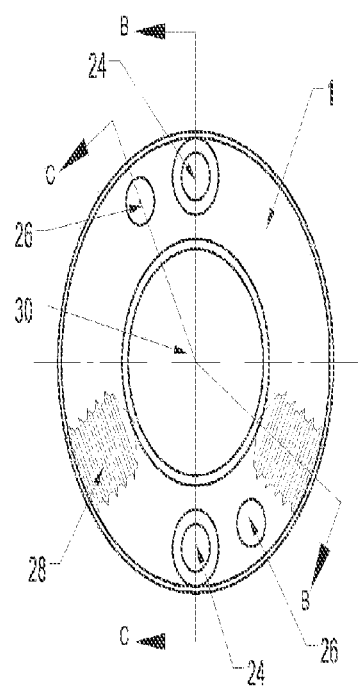
FIG. 3 is an elevation view of the front of a non-conductive coupling in accordance with an embodiment of the present invention.
Figure 4:
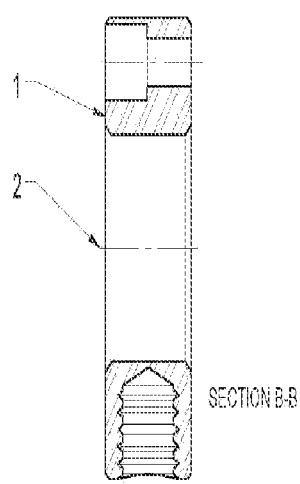
FIG. 4 is a cross-section view of a non-conductive coupling in accordance with an embodiment of the present invention.
Figure 6:
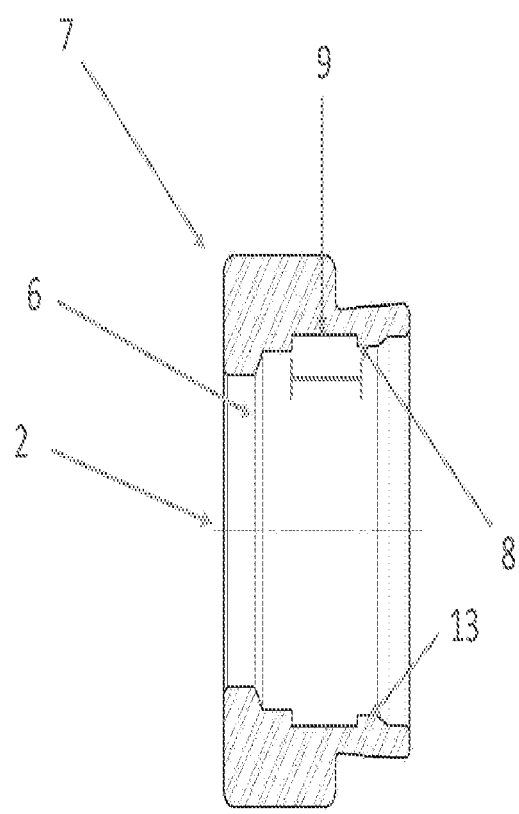
FIG. 6 is a cross-section of a release member in accordance with an embodiment of the present invention.
Figure 7:
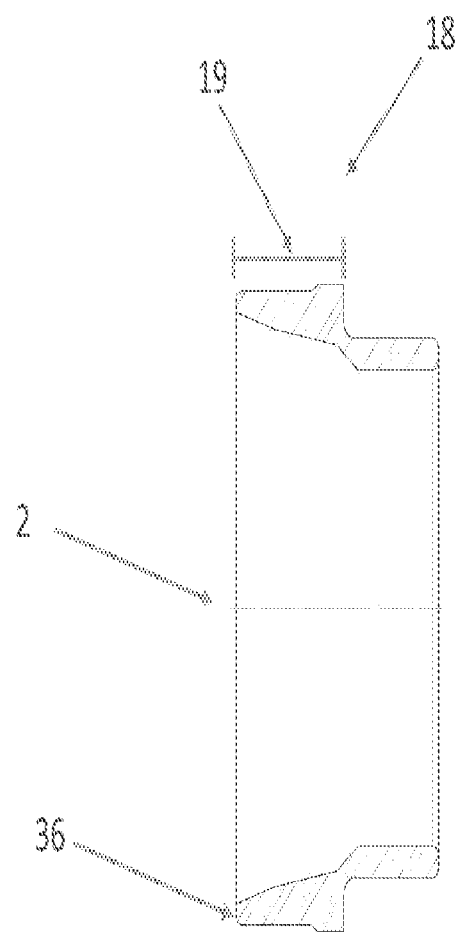
FIG. 7 is a cross-section of an interference member in accordance with an embodiment of the present invention.
Figure 8:
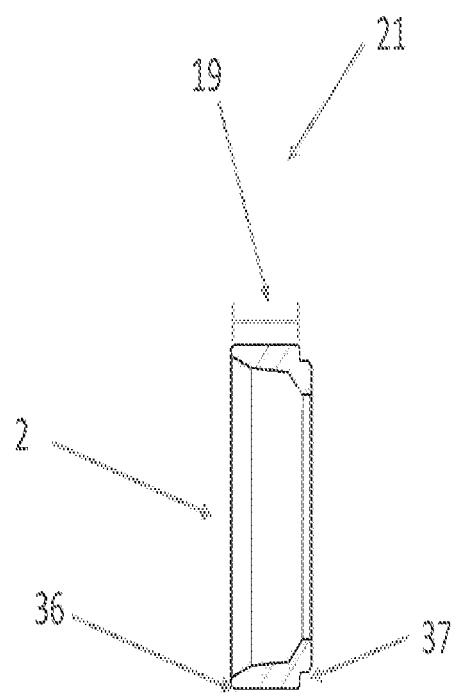
FIG. 8 is a cross-section of another interference member in accordance with an embodiment of the present invention.

The release member 7, seen in FIG. 1, is substantially cylindrical in shape. See FIG. 6. The release member 7 has an internal cavity 6 that is a compound geometry that is revolved around the central axis 2. The internal cavity 6 has a cylindrical section 9 that is sized to receive the engagement section 19 of the interference member 18. See FIG. 7. Release member 7 has a flange 8 that defines the distal end of cylindrical section 9. The flange 8 has an inner diameter 13 that is sized to lock the engagement section 19 of the interference member 18 within the release member 7, when assembled. The inner diameter 13 can be sized to be smaller than the plastic deformation limit of the materials of the release member 7 and interference member 18. In embodiments that are sized in this manner, attempts to press in the interference member 18 into the release member 7 would damage or remove the flange 8. For this reason, the release member 7, in accordance with this embodiment of the invention, has a slot 15 that allows the release member 7 to expand in the radial direction beyond the limits of plastic deformation of a release member 7 that is a continuous revolved geometry (no slot). See FIGS. 1*a* and 6. Once the interference member 18 is installed in a slotted release member 7, the engagement section 19 of the interference member 18 is locked in place within the engagement section 19 of the slotted release member 7 by and a radial or compressive force that is exerted by pulling the two halves of the slotted release member 7 together with a clamping bolt 17. When installed the clamping bolt 17 is recessed within a counter bore 21 within the slotted release member 7. See FIG. 1*a*.

Figure 9:
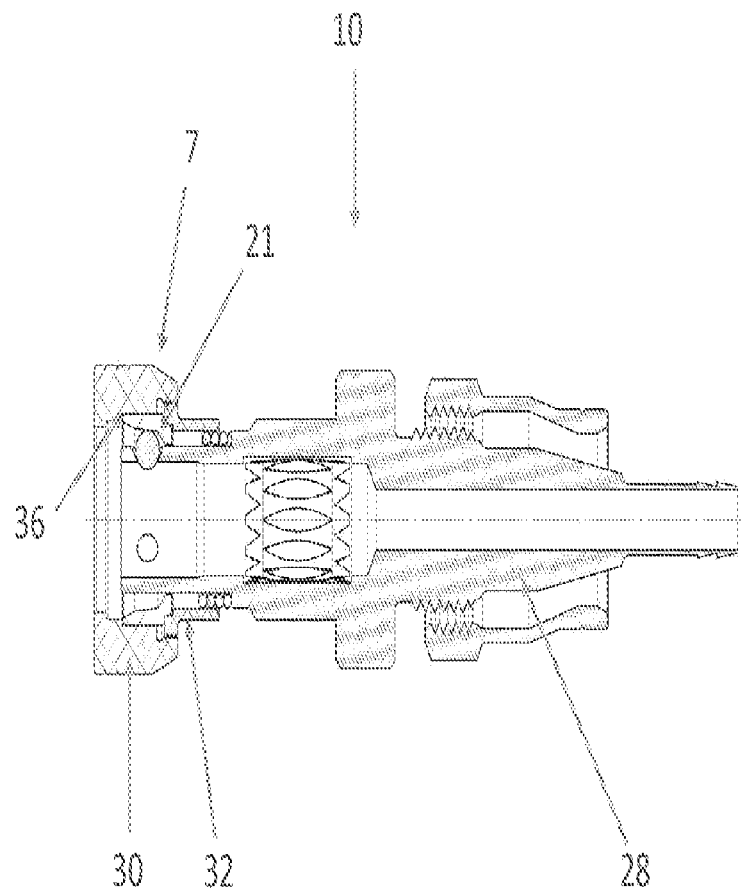
FIG. 9 is a cross-section of another receiving member in accordance with an embodiment of the present invention.
Figure 10:
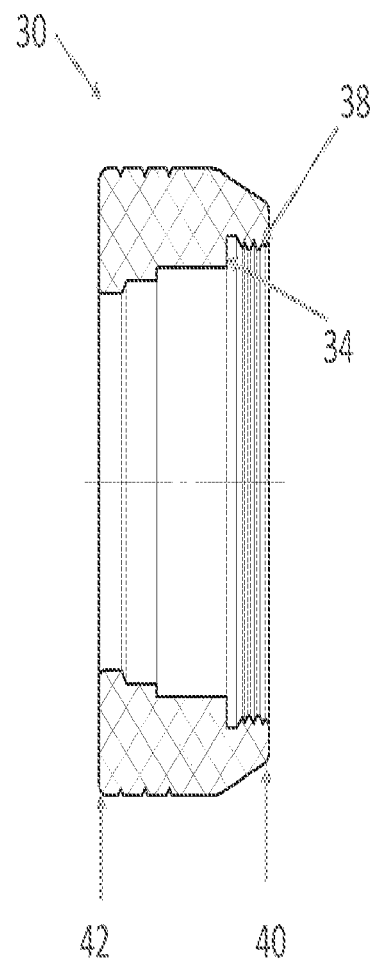
FIG. 10 is a cross-section of the upper section of a release member in accordance with an embodiment of the present invention.
Figure 11:
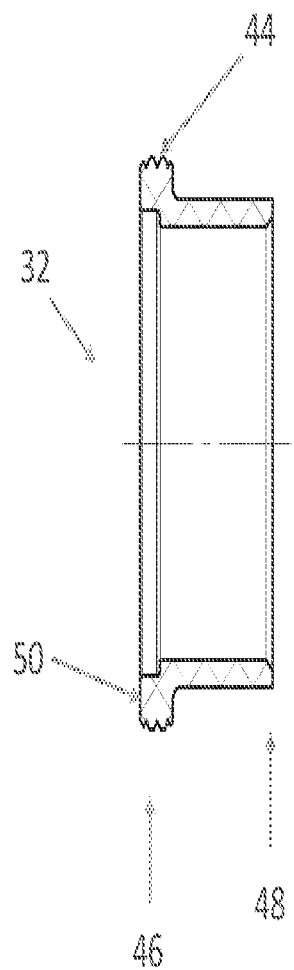
FIG. 11 is a cross-section of the lower section of a release member in accordance with an embodiment of the present invention.

Another embodiment of a receiving member 10 can be seen in FIG. 9. This embodiment has a design that combines the locking section 12 and conduction section 14 of other embodiments in to one continuous receiving member body 28. This embodiment uses a two-piece release member 7. The release member 7 has an upper section 30 and a lower section 32. The uppers section 30 can be mechanically attached to the lower section 32. In this embodiment the upper section 30 is threaded onto the lower section 32 but other embodiments can use any known method of mechanical attachment or the sections can be bonded by methods, including but not limited to, welding, brazing, and adhesives. In embodiments that are mechanically attached, the sections of the release member can disassemble to allow for replacement or modification. The upper section 30 can be made from a non-conductive material such as plastic or ceramic. The lower section 32 can be made from a non-conductive material.

An embodiment of the upper section 30 of the two-piece release member 7 can have a step 34 designed to be in mechanical communication the proximal end 36 and engagement section 19 of interference member 21. See FIGS. 8-11. The upper section 30 has female threads 38 on the proximal end 40.

An embodiment of the lower section 32 of the two-piece release member 7 can have a flange 50 designed to be in mechanical communication with the distal end 37 of interference member 21. See FIGS. 8-11. The lower section 32 has male threads 44 on the proximal end 46. Upper section 30 is threaded onto lower section 32 and interference member 21 is sandwiched in-between the two sections. When threaded together the upper section 30 and lower section 32 exert a compressive force onto interference member 21. Once thread together the upper section 30 and lower section 32 can be bonded together with a solvent, adhesive or any know method of mechanical bonding or welding (such as ultrasonic welding).

Figure 12:
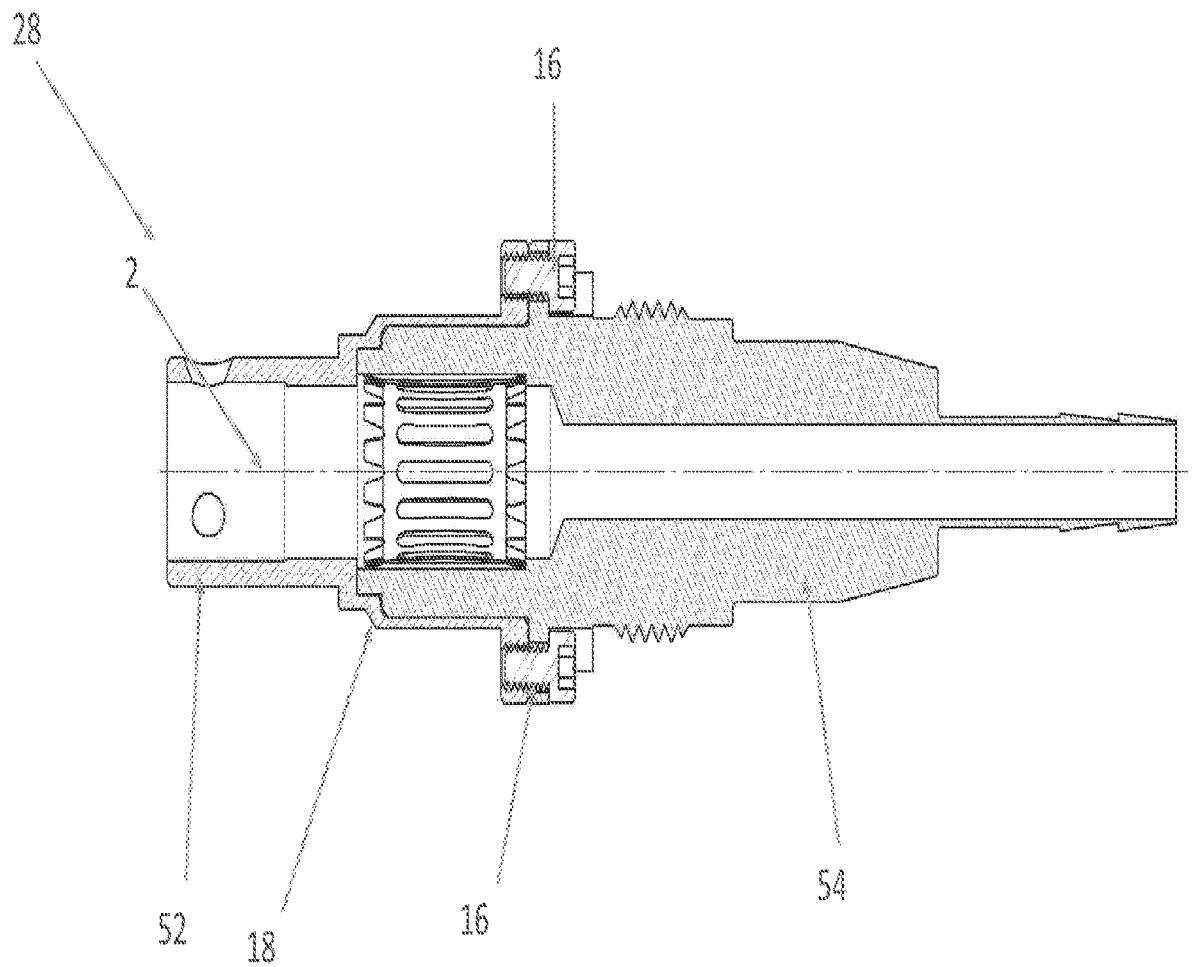
FIG. 12 is a cross-section of receiving member body in accordance with an embodiment of the present invention.
Figure 13:
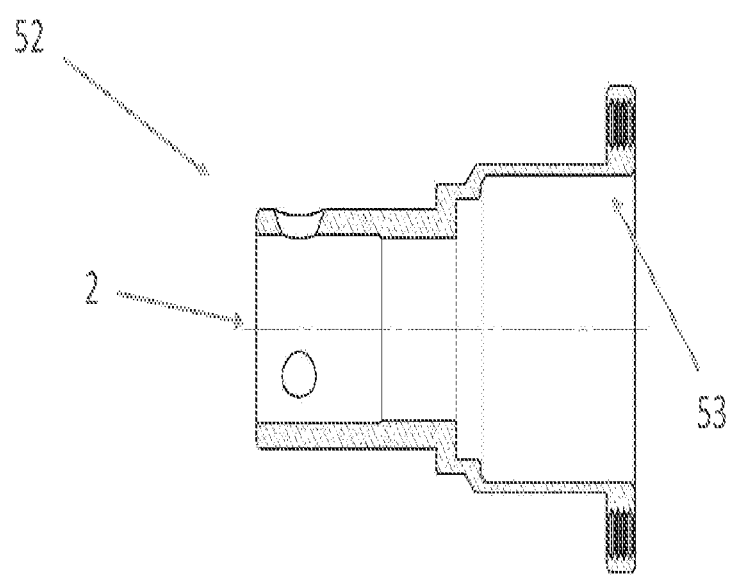
FIG. 13 is a cross-section of a locking section of a release member body in accordance with an embodiment of the present invention.
Figure 14:
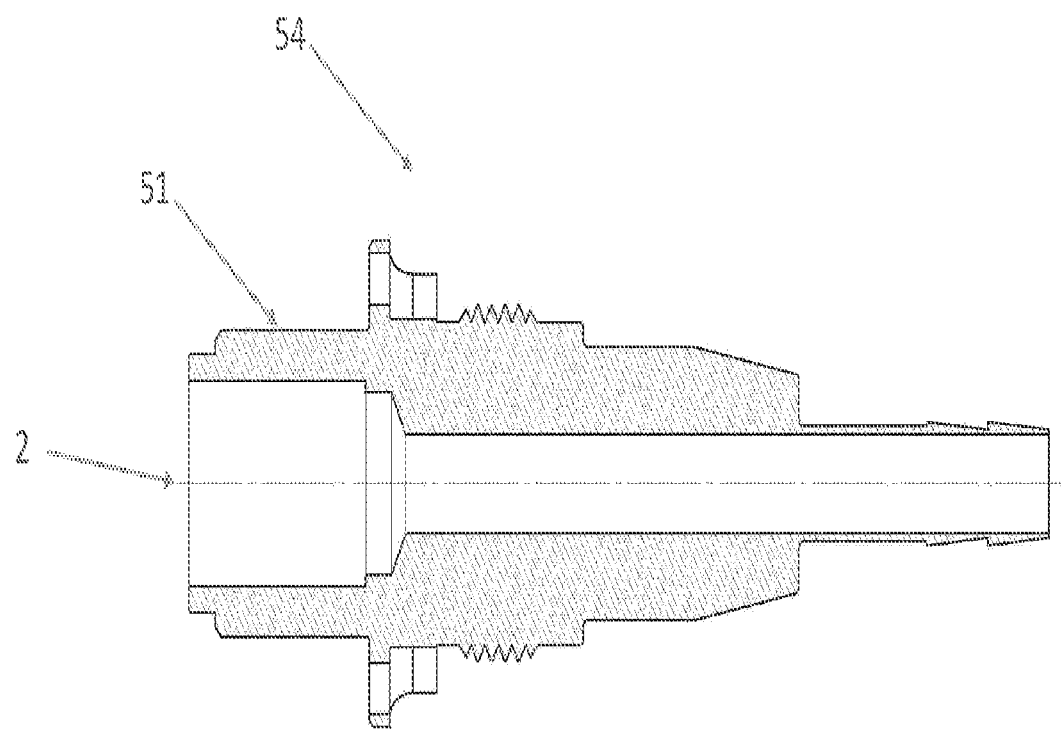
FIG. 14 is a cross-section of a conduction section of a release member body in accordance with an embodiment of the present invention.

The receiving member body 28 can be separated into multiple sections. As seen in FIG. 12, an embodiment can have a locking section 52 that is mechanically attached to a conductive section 54. In this embodiment non-conductive bolts 16 are used to mechanically attach the sections. The locking section 52 has an interlocking section 53, in this embodiment a cylindrical cavity that is at least one-quarter the total length of the locking section 52 about the central axis 2. See FIG. 13. In this embodiment the interlocking section is at least 40% of the total length of the locking section 52 about the central axis 2. See FIG. 13. The interlocking section 53 of the locking section 52 can be concentrically positioned over proximal end 51 of the conductive section 54. See FIGS. 12-14. The concentric assembly of the locking section 52 and conductive section 54 is resistant to bending or deformation about the central axis 2 and with the bolts 16 installed the assembly is rigid and resistant to rotation of the individual sections.

Figure 15:
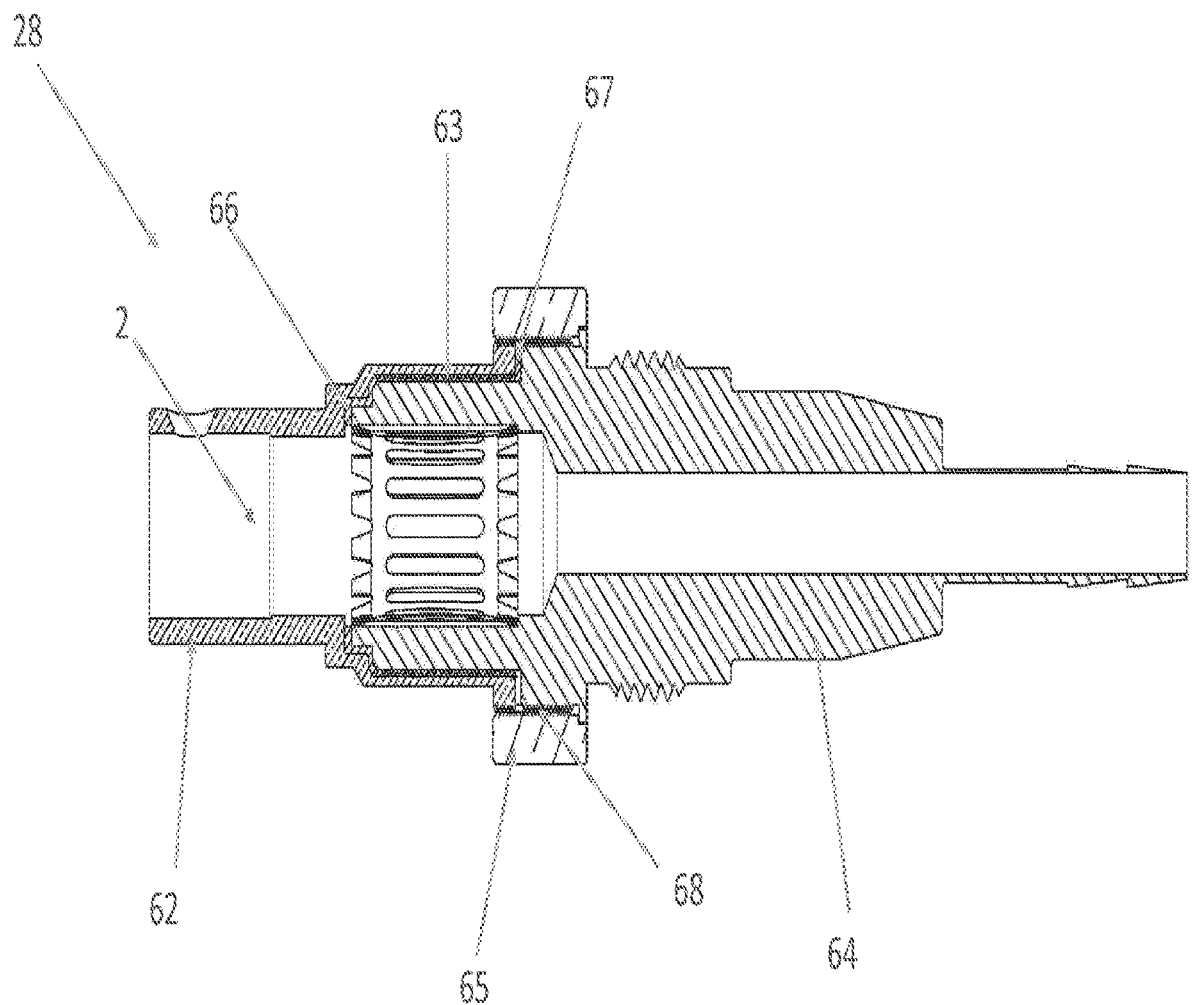
FIG. 15 is a cross-section of another release member body in accordance with an embodiment of the present invention.

Another embodiment of the present invention has a multi piece receiving member body 28 that insulates the locking member 62 from the current path of the conductive member 64 via insulating member 63. See FIG. 15. The insulating member 63 is installed in-between the locking member 62 and the conductive member 64. In this embodiment the insulating member 62 has a proximal flange 66 that separates and insulates the proximal end of the conductive member 64 from the locking member 62. In this embodiment the insulating member 62 has a distal flange 67 that separates and insulates the distal end of the conductive member 64 from the locking member 62. As seen in FIG. 15, the locking section 62, insulating member 63, and conduction section 64 are concentrically aligned and insulating member 63 is sandwiched in between the locking section 62 and conduction section 64. An insulating retainer 65, in this embodiment non-conductive nut, is threaded onto the locking section 62 and conductive section 64 via threads 68. The insulating retainer 65 prevents axial movement of the locking section 62, insulating member 63, and conduction section 64. The insulating retainer 65 can include an anti-rotation feature, including but not limited to a pin, set screw, snap ring, clip, tie wire, and thread locking adhesive. The insulating retainer 65 of this embodiment is a non-conductive nut that has flat faces that can be used to tighten the non-conductive nut about the central axis 2 or to prevent the rotation of the receiving member 10 when installed in the welding torch body (not shown).

The receiving member 10 seen in FIG. 1 includes a conduction member 22 designed to facilitate conduction between the conduction section of the receiving member and the conduction section of the rotating gooseneck (not shown). In this embodiment the conduction section 22 is illustrated as a louvered contact band or contact band as it is commonly known but other embodiments can used other geometries, such as mating tapered and conical ends or other commercially available contact members including but not limited to canted coil springs.

Figure 16:
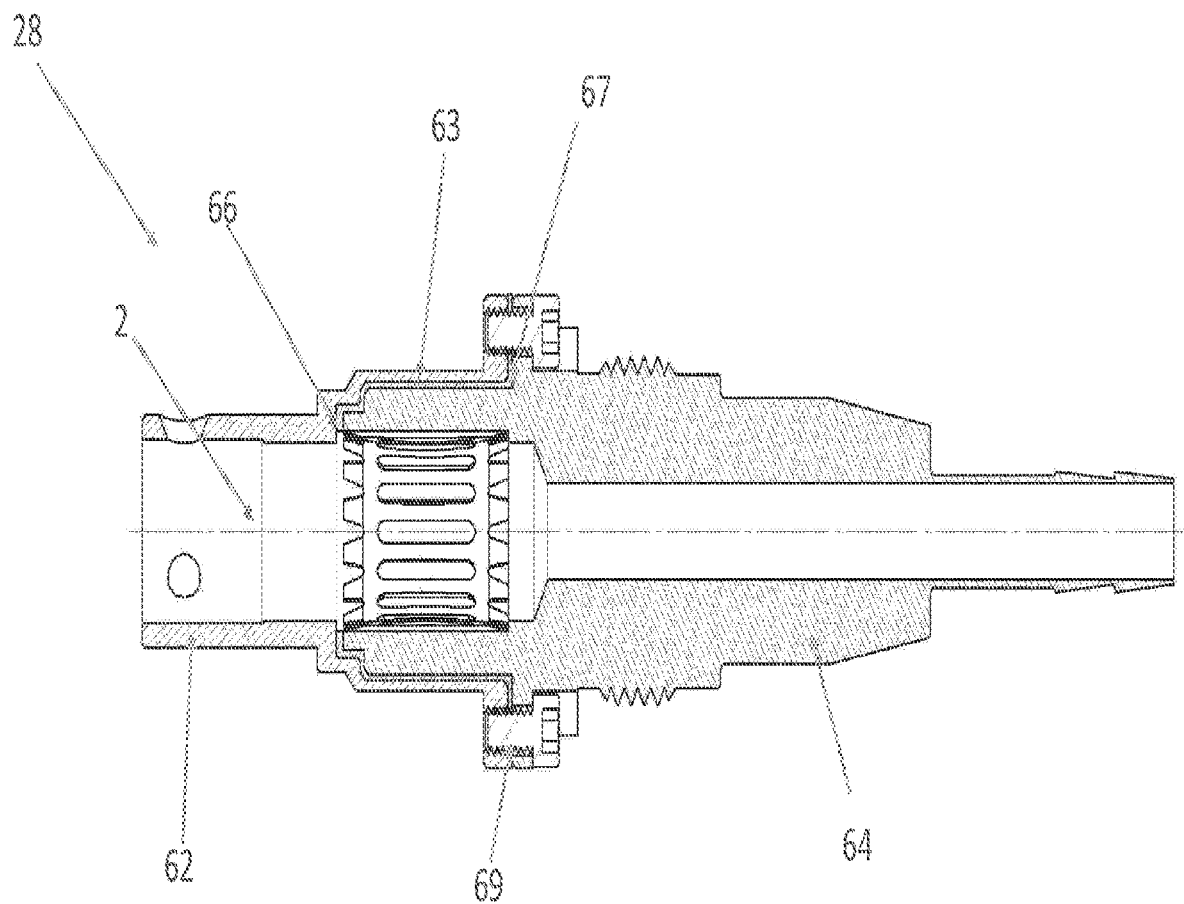
FIG. 16 is a cross-section of another release member body in accordance with an embodiment of the present invention.

Another embodiment of a receiving member body 28 can be seen in FIG. 16. This embodiment uses an insulating member 63 and non-conductive bolts 16 to attach the locking section 62 and the conductive section 64 of the receiving member body 28.

The following paragraphs describe various embodiments disclosed herein.

A first embodiment of a welding torch body includes a distal and a proximal end, a receiving member on the proximal end of the welding torch body, a central axis of the receiving member, a plurality of locking members, an electrical connection, a release member, a non-conductive coupling between a locking section and a conductive section of the receiving member, wherein the receiving member of the welding torch body is configured to receive a lockable gooseneck, when installed in the receiving member the lockable gooseneck is prevented from movement in the axial and radial directions about the central axis of the receiving member by the plurality of locking members, and provided an electrical connection between the lockable gooseneck and welding torch via the electrical connection; and by axial movement of the release member about the central axis of the receiving member the plurality of locking members can restore radial and axial movement to the lockable gooseneck.

A subsequent embodiment of the welding torch body, including the first or any subsequent embodiment of the welding torch body, and a conduction member that facilitates the electrical connection between the lockable gooseneck and the welding torch.

A subsequent embodiment of the welding torch body, including the first or any subsequent embodiment of the welding torch body, wherein the conduction member is a louvered contact band.

A subsequent embodiment of the welding torch body, including the first or any subsequent embodiment of the welding torch body, wherein the conduction member is a canted coil spring.

A subsequent embodiment of the welding torch body, including the first or any subsequent embodiment of the welding torch body, wherein the release member exerts a compressive force onto an interference member.

A subsequent embodiment of the welding torch body, including the first or any subsequent embodiment of the welding torch body, wherein the release member is slotted and the compressive force is created by mechanically clamping together a slot in the release member.

A subsequent embodiment of the welding torch body, including the first or any subsequent embodiment of the welding torch body, wherein the release member has an upper section and a lower section that are threaded together to compress the interference member.

A subsequent embodiment of the welding torch body, including the first or any subsequent embodiment of the welding torch body, wherein the upper section and lower section of the release member are bonded together after compressing the interference member.

A first embodiment of a receiving member for use in a welding torch body a locking section, a conductive section, wherein the locking section and the conductive section are configured to be attached.

A subsequent embodiment of the receiving member, including the first or any subsequent embodiment of the receiving member, wherein, the locking section and conductive section are mechanically attached.

A subsequent embodiment of the receiving member, including the first or any subsequent embodiment of the receiving member, wherein a current path of the conduction section of the receiving member is insulated from the locking section of the receiving member.

A subsequent embodiment of the receiving member, including the first or any subsequent embodiment of the receiving member, including a non-conductive coupling.

A subsequent embodiment of the receiving member, including the first or any subsequent embodiment of the receiving member, including an insulating member.

A subsequent embodiment of the receiving member, including the first or any subsequent embodiment of the receiving member, wherein the locking section includes a cavity that is at least one-quarter the total length of the locking section about a central axis.

The invention claimed is:

1. A MIG welding torch body, comprising:
   a distal end and a proximal end;
   a receiving member on the proximal end of the welding torch body comprising a locking section and a conductive section along a central axis of the receiving member;
   a plurality of locking members, each having an adjustable locking setting; an electrical connection;
   a release member having a slot configured to allow the release member to expand in a radial direction;
   a non-conductive coupling between the locking section and the conductive section of the receiving member, and
   a first bolt and a second bolt passing through the non-conductive coupling in an axial direction extending along the central axis, wherein the first bolt is threaded into the locking section and passes toward the proximal end, and the second bolt is threaded into the conductive section and passes toward the distal end, wherein:
   the receiving member of the MIG welding torch body is configured to receive a lockable gooseneck,
   the electrical connection is positioned between the lockable gooseneck and the MIG welding torch body via the electrical connection, and
   the non-conductive coupling prevents a current flow between the plurality of locking members and the electrical connection,
   the MIG welding torch body further comprising a conduction member that effects the electrical connection between the lockable gooseneck and the MIG welding torch body.

2. The MIG welding torch body of claim 1, wherein the conduction member is a louvered contact band.

3. The MIG welding torch body of claim 1, wherein the conduction member is a canted coil spring.

4. The MIG welding torch body of claim 1, wherein the release member exerts a compressive force onto an interference member.

5. The MIG welding torch body of claim 4, wherein the compressive force is created by mechanically clamping together the slot in the release member.

6. The MIG welding torch body of claim 4, wherein the release member has an upper section and a lower section that are threaded together to compress the interference member.

7. The MIG welding torch body of claim 6, wherein the upper section and lower section of the release member are bonded together after compressing the interference member.

8. A receiving member, having proximal and distal ends, for use in a MIG welding torch body, comprising:
   a locking section;

a release member having a slot configured to allow the release member to expand in a radial direction;
a conductive section; and
a non-conductive coupling, wherein:
the locking section and the conductive section are attachable to one another via the non-conductive coupling, and during assembly and operation the conductive section completes an electrical circuit that is independent of the locking section,
a first bolt and a second bolt pass through the non-conductive coupling in an axial direction extending along a central axis of the receiving member,
the first bolt is threaded into the locking section and passes toward the proximal end of the receiving member,
the second bolt is threaded into the conductive section and passes toward the distal end of the receiving member, and
the locking section and the conductive section are mechanically attached.

9. The receiving member of claim 8, wherein a current path of the conductive section of the receiving member is insulated from the locking section of the receiving member.

10. The receiving member of claim 9, wherein the non-conductive coupling is between the locking section and the conductive section.

11. The receiving member of claim 9, further comprising an insulating member.

12. The receiving member of claim 8, wherein the locking section includes a cavity that is at least one-quarter a total length of the locking section about the central axis of the receiving member.

13. A method of using a receiving member in a MIG welding torch assembly, the receiving member including a locking section, a release member having a slot configured to allow the release member to expand in a radial direction, and a conductive section, wherein the locking section and the conductive section are configured to be attached, the method comprising:
electrically isolating the locking section from a current path of the conductive member;
preventing a rotation of the locking section relative to the conductive member about a central axis;
preventing a rotation of the receiving member relative to the MIG welding torch assembly relative to the central axis; and
attaching the locking section and the conductive section to one another via a non-conductive coupling, wherein a first bolt and a second bolt pass through the non-conductive coupling in an axial direction along the central axis of the receiving member, wherein the first bolt is threaded into the locking section and passes toward a proximal end of the receiving member, and the second bolt is threaded into the conductive section and passes toward a distal end of the receiving member.

14. A method of operating a MIG welding torch assembly comprising a gooseneck rotatable along a central axis and a MIG welding torch body,
the gooseneck having a proximal end and a distal end, an electrical conduction section and a first plurality of locking members,
the MIG welding torch body comprising a proximal end and a distal end, an electrical conduction member, a locking section, a conductive section, a second plurality of locking members, a non-conductive coupling and a release member having a slot configured to allow the release member to expand in a radial direction, the method comprising the steps of:
unlocking and inserting the first plurality of locking members into the MIG welding torch body along the central axis and completing an electrical connection by bringing the electrical conduction section of the gooseneck and the conduction member of the MIG welding torch body into mechanical communication;
electrically isolating the first plurality of locking members and the second plurality of locking members from electrical current during, before or after insertion of the rotatable gooseneck,
rotating the gooseneck about the central axis to achieve a desired radial orientation, locking the rotatable gooseneck in radial and axial directions along the central axis;
attaching the locking section and the conductive section to one another via the non-conductive coupling, wherein a first bolt and a second bolt pass through the non-conductive coupling in an axial direction and along the central axis of the receiving member, wherein the first bolt is threaded into the locking section and passes towards the proximal end of the MIG welding torch body, and
the MIG welding torch body is locked and unlocked by axial movement of the release member about the central axis of the receiving member.

15. The method of using a MIG welding torch assembly of the claim 14, wherein the electrical connection between the electrical conduction section of the rotatable gooseneck and the conduction member of the MIG welding torch body is achieved by inserting the distal end of the rotatable gooseneck into the proximal end of the MIG welding torch body to a predefined insertion depth.

16. The method of using a MIG welding torch assembly of claim 14, wherein the electrical connection between the electrical conduction section of the rotatable gooseneck and the conduction member of the MIG welding torch body is maintained during rotation of the gooseneck about the central axis.

17. The method of using a MIG welding torch assembly of claim 14, wherein the non-conductive coupling is located between the second plurality of locking members and the conduction member of the MIG welding torch body along the central axis.

* * * * *